United States Patent [19]

Bell

[11] 4,001,070

[45] Jan. 4, 1977

[54] TIRE BUILDING APPARATUS

[75] Inventor: Robert Graham Bell, Hartlebury, England

[73] Assignee: National-Standard Company, Limited, Kidderminster, England

[22] Filed: Oct. 23, 1975

[21] Appl. No.: 625,189

Related U.S. Application Data

[63] Continuation of Ser. No. 450,677, March 13, 1974, abandoned.

[30] Foreign Application Priority Data

June 15, 1973 United Kingdom ............ 28522/73

[52] U.S. Cl. ............................. 156/398; 156/415; 156/420
[51] Int. Cl.[2] ......................................... B29H 17/26
[58] Field of Search .......... 156/123, 128, 131, 132, 156/133, 394, 398, 403, 414–420

[56] References Cited

UNITED STATES PATENTS

| | | | |
|---|---|---|---|
| 3,053,308 | 9/1962 | Vanzo et al. | 156/416 |
| 3,188,260 | 6/1965 | Nebout | 156/415 |
| 3,654,025 | 4/1972 | Winzer et al. | 156/415 |
| 3,674,604 | 7/1972 | Gazuit | 156/415 |
| 3,718,520 | 2/1973 | Leblond | 156/400 |
| 3,767,509 | 10/1973 | Gazuit | 156/415 |
| 3,833,444 | 9/1974 | Mallory | 156/400 |
| 3,833,445 | 9/1974 | Mallory et al. | 156/401 |
| 3,883,387 | 5/1975 | Csatlos | 156/133 |

*Primary Examiner*—Charles E. Van Horn
*Assistant Examiner*—John E. Kittle
*Attorney, Agent, or Firm*—Johnson, Dienner, Emrich & Wagner

[57] ABSTRACT

A tire building apparatus comprising an expandible former embodying axially movable former expanding and contracting means to dispose the former in positions defining firm supporting surfaces of different radii, said expanding and contracting means ensuring symmetrical expansion and contraction of the former with respect to a transverse plane of the former. Axially-movable tire bead core locating and supporting means are disposed on opposite sides of said transverse plane. Further means, for example at least one rack and pinion mechanism connecting the two bead core locating and supporting means, is provided to ensure that axial movements of the two bead core locating and supporting means occur symmetrically with respect to said transverse plane. Fluid pressure-actuated means are provided for effecting adjustment of the axial position of said tire bead locating and supporting means independently of the degree of expansion of the former, whereby a desired tensioning of the components of a tire mounted on the former can be achieved while maintaining said components symmetrically disposed on the former with respect to said transverse plane. Means may be provided for varying the pressure of the fluid supplied to said fluid pressure-actuated means so that the tension applied to the tire components can be controlled as desired during shaping of the tire components.

8 Claims, 9 Drawing Figures

TIRE BUILDING APPARATUS

This is a continuation of application Ser. No. 450,677 filed Mar. 13, 1974 now abandoned. This invention relates to an improved tyre building apparatus which in particular, but not exclusively, is suitable for the manufacture of radial cord carcass tyres.

It is known prior to the present invention to provide tyre building apparatus comprising a former which in a starting or initial position thereof provides a substantially cylindrical surface for supporting tyre carcass material in the form of a cylinder thereon. The former may, for example, be of a construction embodying a plurality of circumferentially arranged segments each of which includes a plurality of supporting members or blades extending in directions circumferentially of the former, and which are in end-to-end interleaved relation between adjacent segments so that upon the outward radial displacement of the segments, the outer surfaces of the supporting members or blades together define supporting surfaces of different radii or peripheral extent. Thus, after disposition of tyre carcass material around the former, the latter may be expanded to form the tyre carcass material into a configuration approximating that of a completed tyre for the application, for example, of breaker and tread components to the crown portion of the tyre carcass. The supporting members or blades of the segments in the position of the former last noted provide a firm surface of desired peripheral extent supporting the tyre carcass material, enabling components such as breakers and tread components to be well stitched to the tyre carcass.

It is also known in the tyre building apparatus described above to provide tyre bead core locating and supporting means which, in an operative position, lock, in axially spaced-apart relation and concentrically of the longitudinal axis of the former, the axially outer ends of the tyre carcass material together with the tyre bead cores.

In use of apparatus of the kind described above, it will be appreciated that it is essential that the former expands symmetrically with respect to a transverse plane of the former about which the tyre carcass material is symmetrically disposed in the contracted position of the former, so that as the former expands the expanded tyre carcass material remains symmetrically disposed with respect to a plane bisecting the crown of the tyre carcass. It is therefore customary known apparatus to design the expanding and contracting means of the former so that this symmetry of movement is achieved when the former is expanded.

When apparatus of the kind described above is in use, it will be appreciated that, as the former expands to alter the configuration of the tyre carcass material thereon from cylindrical shape to substantially the shape of the finished tyre, the two bead cores of the tyre will have to approach one another. In the past it has been common practice to allow the bead cores to find their own positions as the former is expanded, by allowing the aforementioned bead core locating and supporting means to move freely inwards as the former expands. This arrangement, however, has not been found entirely satisfactory, since the two bead core locating and supporting means do not necessarily move through equal distances towards one another, with the result that the two bead cores are not accurately located symmetrically with respect to said transverse plane of the former in the expanded position of the former. This unequal movement of the bead cores can be caused, for example, by the frictional resistance to movement of one of the tyre bead core locating and supporting means being greater than that of the other. It has also been proposed in apparatus of the kind described above to drive mechanically both the expanding and contracting means of the former and the bead core locating and supporting means during expansion and contraction of the former. For example, it has been proposed to provide a longitudinally disposed shaft within the former which is provided with first oppositely-handed screw-threaded portions on either side of said transverse plane and to mount nuts on these screw-threaded portions which are arranged to drive pusher rings disposed on each side of said transverse plane. These pusher rings are connected by means of pusher arms to the aforesaid segments of the former, the axially inner ends of pairs of these pusher arms being provided with toothed quadrants which are in meshing engagement with one another. When the shaft is rotated the pairs of meshing pusher arms move symmetrically with respect to said transverse plane to move the associated segments radially and symmetrically with respect to said transverse plane. Second oppositely-handed screw-threaded portions on said shaft, disposed on either side of said transverse plane, receive nuts which, when the shaft is rotated, serve to displace the tyre bead core locating and supporting means axially with respect to the former. By suitably choosing the pitch of the screw-threads of the first and second screw-threaded portions it can be arranged that the bead core locating and supporting means move towards each other, symmetrically with respect to said transverse plane, through a distance appropriate to the degree of expansion of the former under the influence of said pusher arms. Such an arrangement, however, is rather inflexible, since unless provision is made for replacing the shaft and nuts with a shaft and nuts having different ratios between the pitches of the threads of the first and second screw-threaded portions, it is impossible to vary the spacing between the two bead cores of a tyre for a given tyre diameter. Furthermore, it is possible for the expanded tyre to be either over- or under-tensioned by such a differential mechanical drive arrangement.

The present invention seeks to provide a tyre building apparatus which does not have the disadvantages described above.

According to the invention a tyre building apparatus comprises an expandible former embodying axially movable former expanding and contracting means to dispose the former in positions defining firm supporting surfaces of different radii, said expanding and contracting means ensuring symmetrical expansion and contraction of the former with respect to a transverse plane of the former, axially-movable tyre bead core locating and supporting means disposed on opposite sides of said transverse plane, further means ensuring that axial movements of the two bead core locating and supporting means occur symmetrically with respect to said transverse plane, and fluid pressure-actuated means for effecting adjustment of the axial position of said tyre bead locating and supporting means independently of the degree of expansion of the former, whereby a desired tensioning of the components of a tyre mounted on the former can be achieved whilst maintaining said components symmetrically disposed on the former with respect to said transverse plane.

Preferably, the means for ensuring that the two bead core locating and supporting means move symmetrically with respect to said transverse plane comprises at least one rack and pinion mechanism connecting the two bead core locating and supporting means. For example, each tyre bead locating and supporting means may be connected to a different one of a pair of spaced-apart parallel toothed racks with the teeth of one rack facing the teeth of the other rack and a toothed pinion meshing with the teeth of both racks and arranged to rotate about an axis fixed relative to said transverse plane.

Preferably, the pressure of the fluid supplied to said fluid pressure-actuated means can be varied so that the tension applied to the tyre components can be controlled as desired during shaping of the tyre components. Normally, the fluid employed will be compressed air.

The means for expanding and contracting the former may comprise the above-described known arrangement having a longitudinally disposed shaft within the former which is provided with oppositely-handed screw-threaded portions on each side of said transverse plane, nuts on these screw-threaded portions being arranged to actuate pusher rings as previously described. The invention will now be described, by way of example, with reference to the accompanying drawings, in which

In FIGS. 1a and 1b only half of the axial section of the apparatus is shown, since the apparatus is substantially symmetrical about its longitudinal axis which is designated by the letters X—X in these Figures. It will also be appreciated that two Figures, namely FIGS. 1a and 1b, have been used to show the part axial section of the apparatus and that these two Figures join at the plane designated by the reference numeral 25 to show the entire apparatus.

The tyre building apparatus shown in FIGS. 1a to 7 is in the form of an expandible former having an intermediate drum assembly, generally designated by the reference numeral 4, and right-hand and left-hand end drum assemblies, generally designated by the numerals 5 and 6, respectively. The intermediate drum assembly comprises a plurality of circumferentially arranged segments 8, each of which is formed with a body portion 14 of inverted U-shape cross-section (as shown most clearly in FIG. 7) having two spaced-apart, radially inwardly extending limbs 16 between which the axially inner ends of the pusher arms 17 extend and in which the latter are pivotally mounted, as at 18. The pusher arms 17 lie in planes extending axially of the drum assembly 4, and having their axially outer ends pivoted at 19 in recesses 21 in axially spaced-apart pusher rings 20. The pusher arms 17 adjacent their axially inner ends are provided with identical gear teeth 24 which mesh on the transverse centre plane 25 of the drum assembly 4 perpendicular to the axis of the pusher rings 20. The body portions 14, pusher arms 17, pusher rings 20 and associated components, together with a hollow outer shaft 32, in which an inner shaft 26 is arranged, define, in part, intermediate drum expanding and contracting means. In the intermediate drum expanding and contracting means shown in FIGS. 1a to 7 the inner shaft 26 is formed with left- and right-hand screw-threaded shaft sections 28 and 29, respectively, joined by a collar 27 at their opposed axially inner ends for keying the two shaft sections together for conjoint rotation. Nuts 30 have threaded engagement with the screw-threaded portion of each of the shaft sections 28 and 29, each of which carries diametrically opposed nut adapters 31 which extend through axially extending slots 33 disposed in diametrically opposed relation in the hollow shaft 32, one such slot being provided for each of the nut adapters 31. The nut adapters 31 have the pusher rings 20 secured thereto and are themselves secured to the nuts 30 by end members 34 on the nuts. Mounted on the hollow shaft 32, symmetrically with respect to the plane 25, is a guide block comprising a hub 38 having end flanges 41 at its axially outer ends. The flanges 41, which are slotted at 40 to receive the pushers arms 17, serve to guide and prevent relative circumferential movement of the adjacent portions of the pushers arms 17 during operation of the apparatus and add rigidity to the construction of the former 1 in a circumferential direction.

Figure 1A:
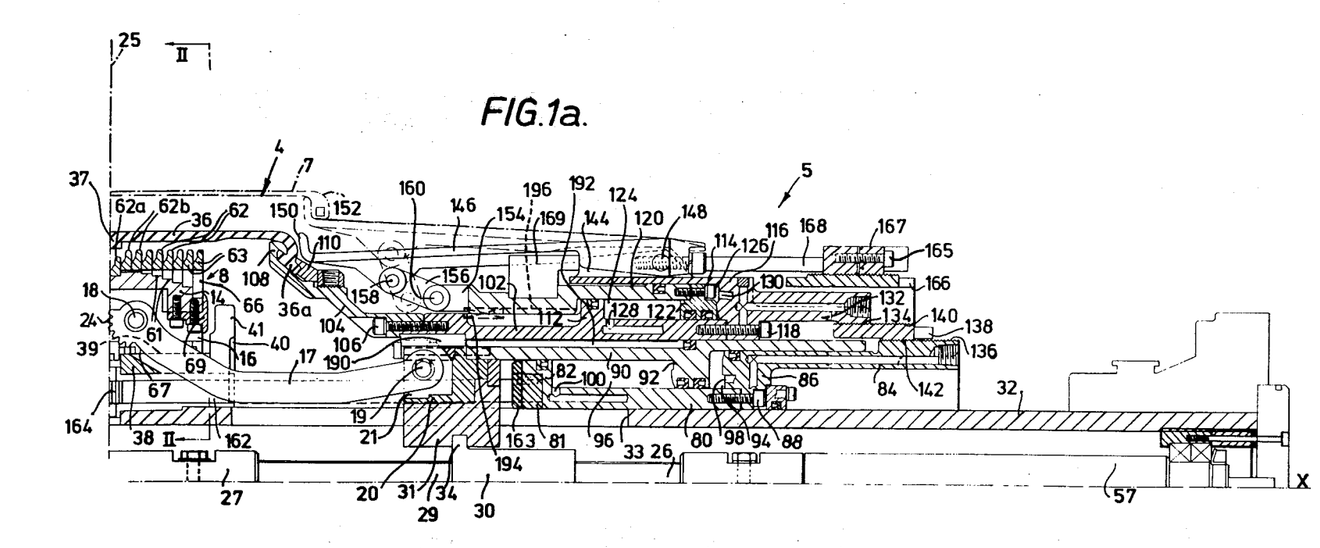
FIG. 1a is a sectional elevation through the right-hand part of a tyre building apparatus in accordance with the invention, this FIG. showing the former of the apparatus in a contracted position.

FIG. 1a shows the position of the parts in the initial or starting position for receiving a partially pre-assembled tyre carcass 7 around an elastic drum sleeve 36 extending between the axially inner ends of the drum assemblies 5 and 6. By expanding the intermediate drum assembly 4 to the position of the parts shown in FIG. 1b. the tyre carcass 7 is expanded to shape the crown portion thereof into a configuration conforming substantially to that of a carcass of a cured tyre. In the initial position of the parts, the inner shaft 26 has been suitably rotated by drive means, including a drive shaft 57, to dispose the pusher rings 20 to their axially outermost positions with respect to each other.

After placement of the tyre carcass in position as shown in FIG. 1a, the inner shaft 26 is rotated to effect conjoint axially inward movement of the pushers rings 20 toward each other at the same rate. Due to the meshing engagement of the gear teeth 24, the drum assembly 4 expands to positions for progressively forming the crown portion of the tyre carcass on the drum sleeve 36 to a configuration conforming substantially to that of the crown portion of the carcass of a cured tyre.

Figure 1B:
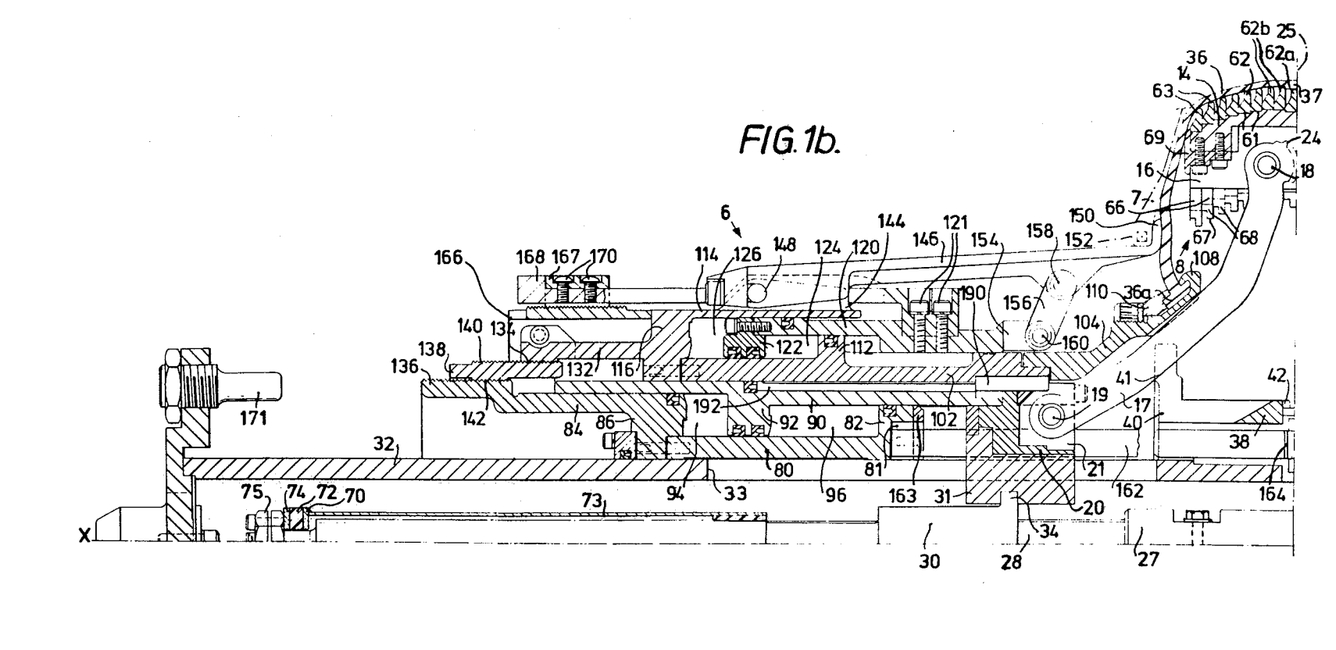
FIG. 1b is a view similar to FIG. 1a of the left-hand part of the apparatus, but showing the former in its expanded position.

The meshing of the gear teeth 24 rigidly and accurately disposes the segments 8 with respect to each other so that they remain symmetrical about the longitudinal axis of the former 1. With the drum assembly 4 expanded to its outermost position, as shown in FIG. 1b, breaker plies and a tread cap may be placed on the expanded tyre carcass. It will be noted that in the drum assembly 4 the gear teeth 24 are constantly in mesh, and as the segments 8 are consequently forced an equal distance radially outwardly, perpendicular to the axis of the pusher rings 20, the segments 8 remain substantially equidistant from the axis X—X of the former 1. The gear teeth are so developed as to maintain the segments 8 in equidistant position serving to resist unequal roller pressures and also side pressures, such as are present in the application of breaker plies and/or a tread cap as may occur in conventional stitching operations.

Figure 2:
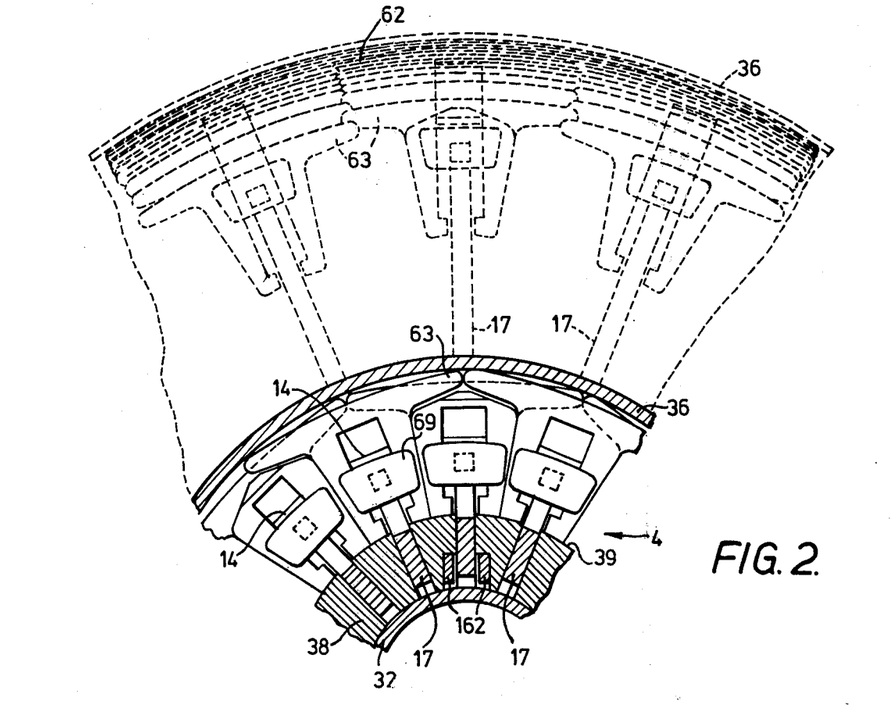
FIG. 2 is a vertical sectional view taken substantially along the line II—II of FIG. 1a looking in the direction indicated by the arrows, showing in full lines an intermediate expandible drum assembly of the apparatus in contracted position and in dotted lines the intermediate expandible drum assembly in expanded position.
Figure 3:
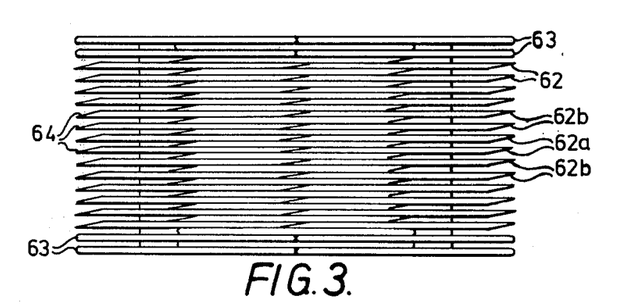
FIG. 3 is a plan of the supporting members of three adjacent segments of the intermediate drum assembly of the apparatus of FIGS. 1a and 1b, showing the relationship of the supporting members in the contracted position of the intermediate drum assembly.
Figure 4:
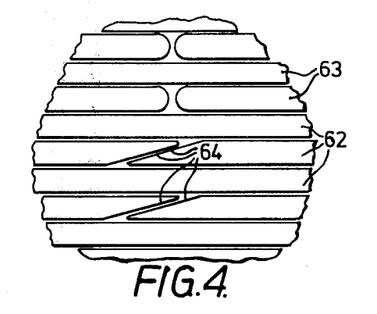
FIG. 4 is a detailed enlarged view of a portion of FIG. 3.

In each segment 8, a plurality of intermediate supporting members 62, as best seen in FIGS. 2 to 7, are supported on central positioning shoulders 61 of the body portion 14 in expanded position of the segment, and a plurality of end supporting members 63 are supported on the positioning shoulders 61 at the axially outer ends of the body portion 14. The several supporting members 62, 63 extend circumferentially of each segment 8 in interleaved relationship with the several supporting members of the adjacent segments, as best seen in FIGS. 2–4, so as to provide in the contracted position of the drum assembly 4 a substantially cylindrical surface over which the tyre carcass 7 can be slipped, with the surfaces 67 of the majority of the supporting members resting on the cylindrical surface 39 of the guide block hub 38. It will be observed, however, that the two centrally disposed supporting members 62 associated with each segment 8 (and designated by the reference numeral 62a in FIGS. 1a and 1b) have their radially outer surfaces disposed radially inwardly in relation to the radially outer surfaces of the immediately adjacent supporting members 62, both in the expanded and contracted positions of the drum assembly 4. There is thus formed a circumferential recess around the drum assembly 4, disposed symmetrically with respect to the plane 25, which receives a circumferential bead 37 formed around the inner surface of the elastic sleeve 36 mid-way between the ends of the latter. This bead 37 positively locates the sleeve 36 with respect to the drum assembly 4 in the region of the centre plane 25.

Figure 5:
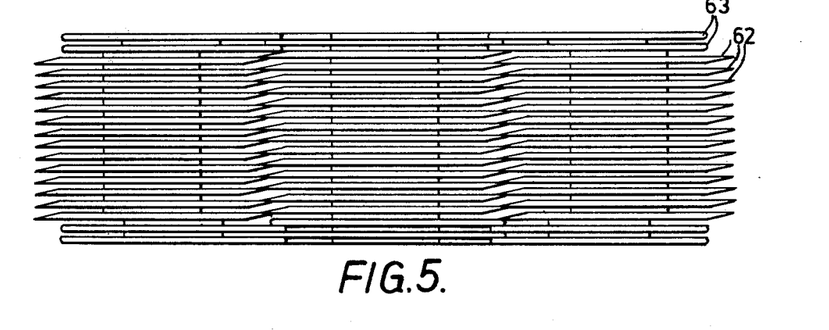
FIG. 5 is a view similar to FIG. 3, but showing the relationship of the supporting members in the expanded position of the intermediate drum assembly.
Figure 6:
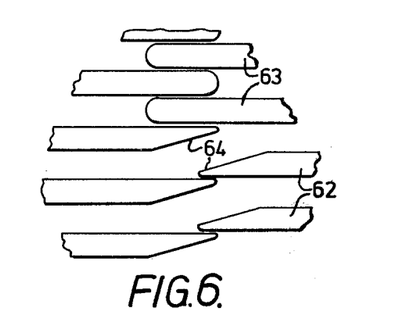
FIG. 6 is a detailed enlarged view of a portion of FIG. 5.

Referring again to FIGS. 3, 4 and 7, the intermediate supporting members 62 are tapered at their outer end portions 64, which, in the expanded position of the drum assembly 4 shown in FIG. 5, are in overlapped relation. Preferably, the outer tips of the outer end portions 64 are slightly rounded, as best seen in FIGS. 4 and 6. The adjacent tapered surfaces of the interleaved supporting members 62 have sliding engagement relative to each other and are retained in interleaved relation in the expanded position of the drum assembly 4, thus to provide a firm supporting surface area to dispose the central portion of the tyre carcass 7 substantially into the configuraton of the crown of the carcass of a cured tyre. The end supporting members 63 associated with adjacent segments 8 are also disposed in interleaved relation but, as shown, are preferably not tapered at their outer end portions so that the adjacent end supporting members 63 have flat side engaging surfaces to prevent axial distortion of the intermediate drum assembly 4 upon expansion and contraction thereof. The outer tips of the outer end portions of the outer supporting members 63 are preferably rounded as best seen in FIGS. 4 and 6.

Figure 7:
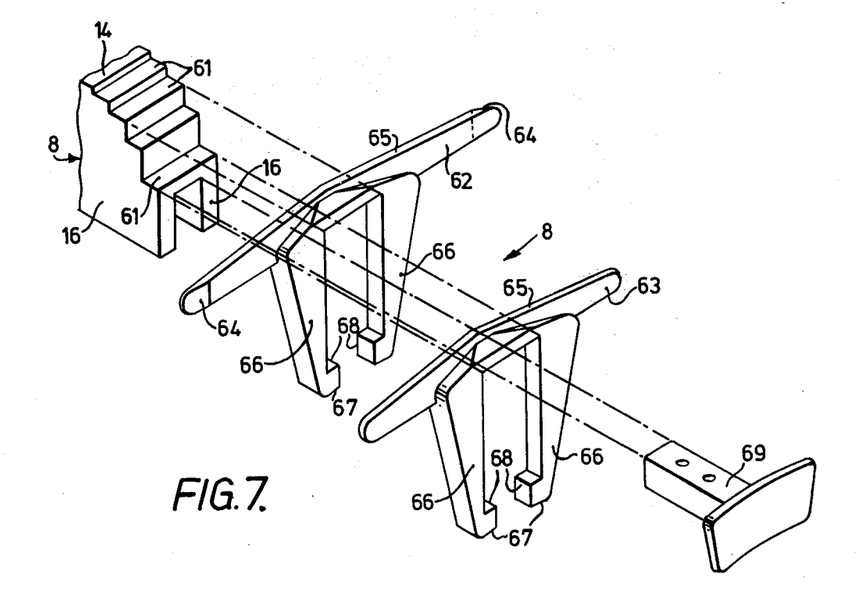
FIG. 7 is an exploded perspective view showing how typical outer and intermediate supporting members are assembled in a segment.

As best seen in FIG. 7, each of the supporting members 62 and 63 is of generally T-shaped configuration having opposed spaced-apart arms 66 extending substantially radially inwardly, symmetrically with respect to the circumferentially curved supporting portions 65 of the supporting members. The arms 66 have inwardly-extending end flanges 68, the radially inner surfaces 67 of which, in the contracted position of the drum assembly 4 and with the exception of the supporting members 62a, engage with the outer surface 39 of the hub 38 serving to dispose the several supporting members in positions defining a substantially cylindrical surface. In the case of the supporting members 62a, the end flange 68 enter a circumferential gap 2 midway between the ends of the hub 38. Upon expansion of the drum assembly 4, the supporting members assume the positions shown in FIG. 1b and in dotted lines in FIG. 2 so as to shape the tyre carcass 7 into a crown portion substantially conforming to that of the crown of the carcass of a cured tyre. As regards this expanded position of the drum assembly 4, it will be seen in FIGS. 1a and 1b that in the body portion 14 of each segment 8 the shoulders 61 are in a stepped configuration, there being a separate shoulder 61 for each of the supporting members 62, 63 except for the supporting members designated 62b. The two supporting members 62b on each side of the plane 25 share a common shoulder 61, with the result that, in the expanded position of the drum assembly 4, a central part of the elastic sleeve 36 overlying the four supporting members 62b and the two supporting members 62a has a truly cylindrical shape. The several supporting members 62, 63 of each segment 8 are maintained in axially assembled position on the body portion 14 by suitable end anchor members 69.

The inner portion of FIG. 2 shows in full lines the drum assembly 4 in contracted position to which it is returned after completion of the assembly of the components of a tyre, the geometry being such that the drum assembly 4, and components at the axially inner ends of the end drum assemblies 5 and 6, contract together with the elastic sleeve 36 to the positions shown in FIGS. 1a to enable removal in the axial direction of the completed assembly of tyre components from the apparatus.

Referring again to FIG. 1b, the drum assembly 6 comprises a resilient stop means defined by a hollow sleeve 73 extending around the screw-threaded shaft section 28 and to the axially outer end of which is welded an inner plate 70. A resilient member 72, for example of polyurethane material, is disposed between the inner plate 70 and an outer plate 74 to provide a resilient stop means for arresting or defining the outward position of the nuts 30 with respect to each other. The resilient stop assembly formed by the inner and outer plates 70 and 74 with the resilient member 72 therebetween is secured to the outer end of shaft section 28 by a rotatable self-locking nut 75. Thus, as the result of maladjustment, switch failure or the like, any undue outward axial movement of the nuts 30 with respect to each other is gradually arrested to prevent any undesirable high stress in any of the components. The position of the resilient stop means described above may be readily adjusted by means of the self-locking nut 75.

The two end drum assemblies 5 and 6 of the former 1 are of substantially identical construction and therefore only one of these assemblies, namely the assembly 5, will be described in detail. In FIG. 1b however, the same reference numerals have been employed to designate items in the drum assembly 6 which are identical with those in the drum assembly 5.

The end drum assembly 5 comprises a tube 80 which is axially slidable on the hollow shaft 32. At its axially inner end the tube 80 has a circumferential, outwardly-projecting flange 82. A sleeve 84 disposed axially outwardly of the tube 80 has a circumferential, inwardly-projecting flange 86 which is secured to the axially outer end of the tube 80 by bolts 88.

Slidably mounted on the sleeve 84 and the flange 82 is a sleeve 90 having a circumferential, inwardly-projecting flange 92 disposed between the flanges 82 and 86. The items 80, 82, 86, 90 and 92 form a first double-acting piston and cylinder assembly, the flanges 82 and 86 forming the ends of the cylinder and the flange 92 forming the piston. Compressed air can be supplied to the cylinder spaces 94 and 96 via ports 98 and 100, respectively, suitable channels to these ports being provided in the sleeve 84, flange 86 and tube 80. The axially inner end of the sleeve 90 is bolted to the end of the pusher ring 20 by belts 91, only one of which can be seen in FIG. 1a.

Slidably mounted on the sleeve 90 is a tube 102. To the axially inner end of this tube there is secured a generally frusto-conical support 104 by means of bolts 106. The axially inner end of the support 104 has a hooked flange 108 over which is engaged an enlarged end portion 36a of the elastic sleeve 36 of the drum assembly 4. The enlarged portion 36a is clamped to the support 104 by a ring 110. The elastic sleeve 36 is therefore firmly held at its two ends in the supports 104 of the two end drum assemblies 5 and 6.

Intermediate its ends the tube 102 is provided with a circumferential, outwardly-projecting flange 112. Surrounding the axially outer end portion of the tube 102 and spaced radially outwardly from the radially outer surface of the flange 112 is a sleeve 114. At its axially outer end this sleeve 114 has a circumferential, inwardly-projecting flange 116 which is secured to the axially outer end of the tube 102 by bolts 118.

Slidably mounted between the flange 112 and the sleeve 114 is a further sleeve 120 having, at its axially outer end, a circumferential, inwardly-projecting flange 122 disposed between the flanges 112 and 116. The items 102, 112, 116, 120 and 122 form a second double-acting annular piston and cylinder assembly, the flanges 112 and 116 forming the ends of the cylinder and the flange 122 forming the piston. Compressed air can be supplied to the cylinder spaces 124 and 126 via ports 128 and 130, respectively, suitable channels to these ports being provided in the flange 116 and the tube 102.

At its axially outer end the flange 116 is prolonged by a tubular extension 132 which has an internally screw-threaded portion 134 at its axially outer end. The sleeve 84, at its axially outer end, has an externally screw-threaded portion 136, the screw thread of the latter being of opposite hand compared with the screw thread of the portion 134 of the tubular extension 132. A collar 138 has an externally screw-threaded portion 140 in threaded engagement with the screw-threaded portion 134 of the tubular extension 132, and an internally screw-threaded portion 142 in threaded engagement with the screw-threaded portion 136 of the sleeve 84. It will therefore be appreciated that the assembly constituted by the tube 80 and sleeve 84 is securely fixed to the assembly constituted by the tubular extension 132 and the tube 102 by the collar 138, but that these two assemblies can be adjusted axially with respect to one another by rotation of the collar 138.

Secured to the outer surface of the sleeve 114, and spaced apart equidistantly therearound, are a number of lugs 144, only one of which can be seen in FIG. 1a. In practice there would be at least eight of these lugs 144 at equally spaced intervals around the sleeve 114. A bead core locating and supporting finger 146 is pivotally connected to each of the lugs 144, each such finger being pivoted at its axially outer end to its associated lug by a pivot pin 148 having its axis parallel to a tangent to the outer surface of the sleeve 114. The axially inner end of each finger 46 has an outwardly-turned portion 150 to provide a hook which, as described hereinafter, is engageable with one of the beads 152 of the tyre carcass 7 placed around the drum assembly 4.

Projecting axially inwardly from the axially inner end of the sleeve 120 are a number of lugs 154, equal in number to the number of fingers 146 and spaced apart at equal distances around the sleeve 120. Intermediate its ends, each of the fingers 146 is connected by a link 156 to the axially inner end of an adjacent lug 154, the link 156 being pivotally connected to the finger 146 and to the lug 154 by pivot pins 158 and 160, respectively.

Surrounding the axially outer end of the tubular extension 132 is an externally screw-threaded collar 166 which is threaded into an internally screw-threaded collar 167. The collar 167 is connected to the sleeve 120 by two tie-bars 168, disposed parallel to the longitudinal axis X—X of the apparatus, these two tie-bars being spaced apart at intervals of 180° around the axis X — X so that only one of them can be seen in FIG. 1a. At its axially outer end each tie-bar 168 is secured to the collar 167 by screws 170 (see FIG. 1b) and at its axially inner end each of the tie-bars 168 is provided with a radially inwardly-directed member 169 which is secured to the sleeve 120 by bolts 121 (see FIG. 1b). As will be described hereinafter, the collar 166 serves as an axially-adjustable stop and it can be locked to the collar 167 in a desired axial position relative to the latter by means of a clamping screw 165 which is threaded into a locally circumferentially split portion of the collar 167, as shown in FIG. 1a.

From the description so far, it will be appreciated that, that, in each of the end drum assemblies 5 and 6, the items 80, 84, 138, 132, 114, 146, 102 and 104 can move axially on the hollow shaft 32 as a unit in order to move the end portions 150 of the fingers 146 towards or away from the transverse plane 25 of the former 1. To ensure that these units of the end drum assemblies move symmetrically with respect to the plane 25, the tubes 80 of the two end drum assemblies are linked together by a plurality of rack and pinion mechanisms. In the embodiment shown there are two such rack and pinion mechanisms spaced apart equally around the hollow shaft 32, but only one of these mechanisms can be seen in FIGS. 1a and 1b. Each of these rack and pinion mechanisms comprises a toothed rack 162 held at its axially outer end in a recess 81 in the axially inner end of each of the tubes 80 by a plate 163 and extending axially inwardly from the tube 80 in a direction parallel to the axis X — X. These two racks lie in two planes disposed one on each side of the plane on which the sectional view shown in FIGS. 1a and 1b has been drawn and, strictly speaking, only the rack 162 of FIG. 1a should be shown in these two Figures. However, in order to make the construction clear, the rack 162 has been shown in FIG. 1b, although it will be appreciated that the two racks are spaced apart circumferentially in the drum assembly 4, as can be seen in FIG. 2. The two racks pass through suitably positioned axial slots in the pusher rings 20, the nut adapters 31 and the hub 38 and overlap in the central region of the former 1, the overlapping portions of the two racks being spaced-apart, parallel relationship with their gear teeth facing one another. The two racks each mesh with a toothed pinion 164 which is rotatably journalled in the shaft 32 with the longitudinal axis of the pinion radially disposed with respect to the shaft 32. Additional pinions (not shown) may be provided to mesh with both of the racks 162, in order to distribute the load acting on the pinion teeth. Due to these rack and pinion mechanisms, it will be appreciated that axial movement of the tube 80 of one of the end drum assemblies 5 and 6 will result in an exactly equal and opposite axial movement of the tube 80 of the other end drum assembly. By correct positioning of the tubes 80 on the shaft 32 during initial assembly of the apparatus it can be ensured that the equal and opposite movements of the two tubes 80 take place symmetrically with respect to the plane 25. Consequently, when one of the tubes 80 is moved axially along the shaft 32 the axially inner ends of the bead core locating and supporting fingers 146 of the two end drum assemblies 5 and 6 will move through equal axial distances, symmetrically with respect to the plane 25.

Rotation of the tube 102 relative to the sleeve 90 about the axis X—X is prevented by a key 190 secured to the tube 102 and slidable in a longitudinal keyway 192 in the sleeve 90. Rotation of the sleeve 120 relative to the tube 102 about the axis X—X is prevented by a key 194 secured to the tube 102 and slidable in a longitudinal keyway 196 in the sleeve 120.

In use of the above-described apparatus, a partly preassembled radial tyre carcass 7 in green condition and of generally cylindrical form is slipped over the elastic sleeve 36 with the parts of the apparatus in the positions shown in FIG. 1a, the fingers 146 being in the position shown in full lines. Compressed air is then admitted to the cylinder spaces 126 of both end drum assemblies, with the result that the fingers 146 pivot outwardly, to the position shown in chain lines in FIG. 1a, so that their hooked end portions 150 engage the beads 152 of the tyre carcass to locate it concentrically about the axis X—X. The extent of this outward movement of the fingers 146 is determined by the axially inner end of the adjustable stop collar 167 abutting the axially outer end of the flange 116. Compressed air is then admitted to the cylinder spaces 94 of both end drum assemblies, the cylinder spaces 96 being connected to exhaust. Since the sleeves 90 are connected to the pusher rings 20, the result is that the two tubes 80 are forced axially outward with respect to the plane 25 and thus move the end portions 150 of the fingers 146 of both end drum assemblies symmetrically away from the plane 25 until the axially outer end of the sleeve 84 of the end drum assembly 6 abuts an axially adjustable stop 171 secured to the left-hand end of the shaft 32. This last operation ensures that the carcass material is further located with a selected amount of pretension of the radial tyre cords symmetrically about the plane 25 prior to shaping, it being assumed that the collars 138 have been previously set to suit the bead-to-bead length of the tyre being made and that the stop 171 has been adjusted so that a desired tensioning of the radial tyre cords is achieved.

The shaft 57 is then rotated to cause the nuts 30 to move toward the plane 25, the nuts on opposite sides of this plane moving symmetrically with respect thereto. This causes the pusher rings 20 to move towards one another and to expand the central portion of the former 1 as indicated in FIG. 1b. During the expansion of the drum assembly 4, the tubes 80 and the associated components supporting the fingers 146 move symmetrically towards the plane 25 and are kept in unison by the rack and pinion mechanisms. Compressed air is maintained in the cylinder spaces 126 and 94 throughout the expansion cycle. The pressure of the compressed air in the cylinder spaces 94 can be varied during the shaping to provide the correct level of tension in the tyre cords. The position of the ends 150 of the fingers 146 and hence the beads 152, at any part of the shaping cycle, is determined by the chord length of the carcass plies joining the beads 152 together. After the carcass has been shaped, breaker plies and a tread cap are added to complete the green tyre. When the tyre has been assembled in this way, the former 1 is returned to the position shown in FIG. 1a by rotating the shaft in the direction to cause the nuts 30 to move away from the plane 25 and by exhausting the compressed air from the cylinder spaces 126 and 94. The assembled green tyre can then be moved off the former in the longitudinal direction.

During expansion of the former 1 in the manner described above, it will be appreciated that the components of the tyre carcass 7 move symmetrically with respect to the plane 25 at all times throughout the shaping cycle.

Figure 8:
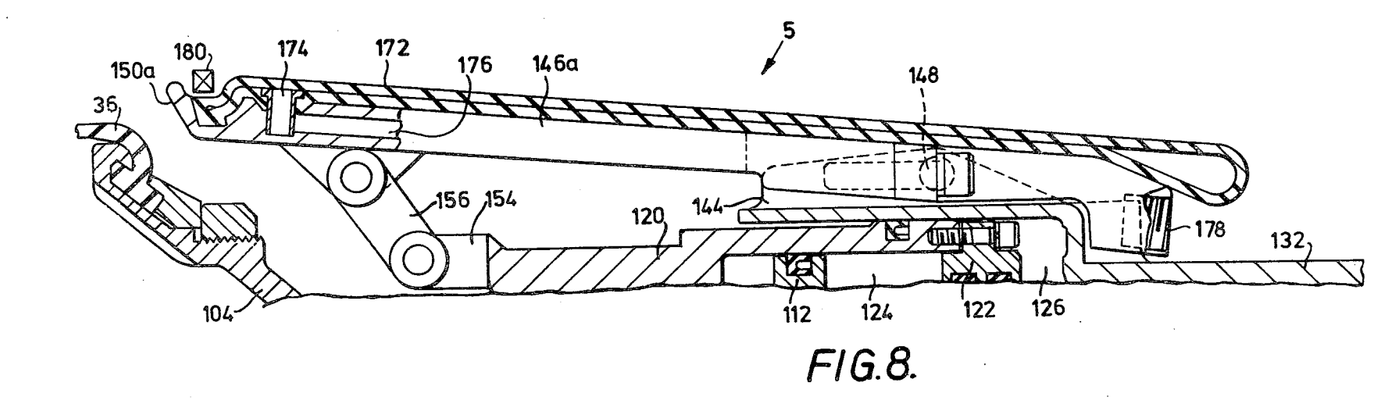
FIG. 8 is a sectional view of part of a modified embodiment of the apparatus of FIGS. 1a to 7.

The above description given with reference to FIGS. 1a to 7 of the drawings relates to the kind of tyre building apparatus, sometimes referred to as a second stage drum, which is adapted to receive a partly pre-assembled tyre carcass, the components forming this partly pre-assembled carcass having been previously assembled on a separate type building drum. The present invention, however, is equally applicable to the kind of tyre building apparatus, sometimes referred to as a unistage drum, in which all, or substantially all, the tyre components are assembled on the same apparatus. An apparatus of this latter kind can be constructed in substantially the same way as the apparatus shown in FIGS. 1a to 7, the main difference being that each of the end drum assemblies 5 and 6 is provided, in known manner, with a ply turn-up bladder. FIG. 8 of the drawings shows part of the end drum assembly 5 of such a modified apparatus.

The end drum assembly 5 partly shown in FIG. 8 provides for the support of an inflatable ply turn-up bladder 172 which is of envelope configuration and is made of rubber. The bladder 172 surrounds the fingers 146a and around its axially inner circumference it is secured to the outwardly-turned portions 150a of these fingers. At least some of the fingers 146a, for example every alternate finger, are designed to supply compressed air to, or exhaust it from, the bladder 172. For this purpose, the finger 146a shown in FIG. 8 has a connector 174 near its axially inner end which communicates with the interior of the bladder 172, the connector 174 being in communication with a longitudinal boring 176 in the finger 146a. At its axially outer end, the boring 176 has screw-threaded enlarged inlet portion 178 for the connection of a line (not shown) for the supply or exhaust of compressed air.

The other end drum assembly of this modified form of the apparatus would also be provided with a ply turn-up bladder like the end drum assembly shown partly in FIG. 8.

In use of this modified form of the apparatus, substantially all of the green components of a tyre are mounted on the former in its contracted position, with the exception of breaker plies and the tread cap. The bladder 172 of each end drum assembly is in the deflated condition shown in FIG. 8, and the axially outer end portions of the tyre component material extend over the deflated bladders, part way along the fingers 146a.

Bead cores 180 (see FIG. 8) are then located over the cylindrical tyre component material employing conventional bead setters (not shown), the two beads being mounted concentrically with respect to the longitudinal axis of the former and symmetrically with respect to the transverse centre plane of the former. Compressed air is then admitted to the cylinder spaces 126 of the two end drum assemblies causing the fingers 146a to pivot outwardly to the position shown in FIG. 8 (these fingers previously having been in the position of the fingers 146 shown in full lines in FIG. 1a). This pivoting of the fingers 146a causes the end portions 150a to expand the tyre material into engagement with the inextensible bead cores 180 to establish the tyre cord peripheries. With air maintained in the cylinder spaces 126, compressed air is admitted to the cylinder spaces 94 (see FIGS. 1a and 1b) of both end drum assemblies and shaping of the carcass is performed in the same way as described above with reference to the embodiment of the apparatus shown in FIGS. 1a to 7.

After assembly of the breaker plies and tread cap, compressed air is supplied to the interior of the entire former through a suitable inlet connection (not shown) provided on the hollow shaft 32, and at the same time compressed air is supplied to the bladders 172 via the borings 176 for the purpose of inflating the bladders. As the bladders 172 inflate they turn up the axially outer end portions of the tyre component material around the bead cores 180 and apply this material against the side walls of the shaped carcass material. Pusher devices (not shown) may be employed in conventional manner to bear on the inflated bladders and assist the turn-up action and complete the placement of the sidewall material. After the sidewall material has been stitched in position, the former is restored to its contracted position and the bladders 172 are deflated, so that the assembled green tyre carcass can be removed longitudinally from the former.

The above described method of using the modified form of the apparatus shown in FIG. 8 may be varied as regards the final stages of turning up the axially outer end portions of the tyre component material. In this variant of the method of use, with the interior of the former pressurised and the bladders 172 deflated, the inner ends of the fingers 146a are moved axially towards the transverse centre plane of the apparatus by exhausting air from the cylinder spaces 94 (see FIGS. 1a and 1b) and supplying compressed air to the cylinder spaces 96, the axially innermost positions of the two tyre beads being determined by an adjustable stop (not shown) on the shaft 32 being engaged by an inward projection (not shown) on the sleeve 84 of one of the end assemblies. This method provides for the carcass materials to be shaped to a geometry closely resembling the finished cured shape of the tyre prior to turn-up of the axially outer end portions of the tyre component material. This substantially eliminates rotation of the bead cores 180 and allows for uniform stress distribution in the tyre cords.

What is claimed is:

1. A tyre building apparatus comprising an expandable former embodying axially movable former expanding and contracting means to dispose the former in positions defining firm supporting surfaces of different radii, said expanding and contracting means ensuring symmetrical expansion and contraction of the former with respect to a transverse plane of the former, tyre bead core locating and supporting means disposed on opposite sides of said transverse plane and axially movable independently of the axial movements of said former expanding and contracting means, further means ensuring that axial movements of the two bead core locating and supporting means occur symmetrically at all times with respect to said transverse plane, axially movable, first fluid pressure-actuated means for effecting adjustment of the axial position of said tyre bead locating and supporting means independently of the degree of expansion of the former, whereby a desired tensioning of the components of a tyre mounted on the former can be achieved whilst maintaining said components symmetrically disposed on the former with respect to said transverse plane, second fluid pressure actuated means axially movable with respect to said first fluid pressure actuated means for effecting radial movement of the tyre bead core locating and supporting means from an inner position to a radially outer position which remains constant independent of the degree of expansion of the former, and adjustable stop means comprising manually adjustable, interengaged first and second screw-threaded means carried by at least one of said fluid-pressure actuated means for the purpose of providing a positive limit to the relative axial movement between said first and second fluid-pressure actuated means, whereby said radially outer position of the tyre bead core locating and supporting means may be accurately determined.

2. A tyre building apparatus as claimed in claim 1, in which the means for ensuring that the two bead core locating and supporting means move symmetrically with respect to said transverse plane comprises at least one rack and pinion mechanism connecting the two bead core locating and supporting means.

3. A tyre building apparatus as claimed in claim 2, in which the or each rack and pinion mechanism comprises a pair of spaced-apart parallel toothed racks disposed substantially parallel to the longitudinal axis of the tyre building apparatus with the teeth of one rack facing the teeth of the other rack and a toothed pinion meshing with the teeth of both racks and arranged to rotate about an axis fixed relative to said transverse plane, each tyre bead locating and supporting means being connected to a different one of the two racks.

4. A tyre building apparatus as claimed in claim 1, comprising means for varying the pressure of the fluid supplied to said fluid pressure-actuated means, so that the tension applied to the tyre components can be controlled as desired during shaping of the tyre components.

5. A tyre building apparatus as claimed in claim 1, in which the means for expanding and contracting the former comprises a longitudinally disposed shaft within the former which is provided with oppositely-handed screw-threaded portions on each side of said transverse plane, nuts on these screw-threaded portions being arranged to actuate pusher rings.

6. A tyre building apparatus comprising an expandable former embodying axially movable former expanding and contracting means to dispose the former in positions defining firm supporting surfaces of different radii, said expanding and contracting means ensuring symmetrical expansion and contraction of the former with respect to a transverse plane of the former, tyre bead core locating and supporting means disposed on opposite sides of said transverse plane and axially movable independently of the axial movements of said former expanding and contracting means at least one rack and pinion mechanism connecting the two bead core locating and supporting means to ensure that axial movements of the two bead core locating and supporting means occurs symmetrically at all times with respect to said transverse plane, axially movable, first fluid pressure-actuated means for effecting adjustment of the axial position of said tyre bead locating and supporting means independently of the degree of expansion of the former, whereby a desired tensioning of the components of a tyre mounted on the former can be achieved whilst maintaining said components symmetrically disposed on the former with respect to said transverse plane, means for varying the pressure of the fluid supplied to said first fluid pressure-actuated means so that the tension applied to the tyre components can be controlled as desired during shaping of the tyre components, second fluid pressure-actuated means axially movable with respect to said first fluid pressure actuated means for effecting radial movement of the tyre bead core locating and supporting means from an inner position to a radially outer position, which remains constant independent of the degree of expansion of the former, and adjustable stop means comprising manually adjustable, interengaged first and second screw-threaded means carried by at least one of said fluid pressure-actuated means for the purpose of providing a positive limit to the relative axial movement between said first and second fluid pressure actuated means, whereby said radially outer position of the tyre bead core locating and supporting means may be accurately determined.

7. A tyre building apparatus as claimed in claim 6, in which the or each rack and pinion mechanism comprises a pair of spaced-apart parallel toothed racks disposed substantially parallel to the longitudinally axis of the apparatus with the teeth of one rack facing the teeth of the other rack and a toothed pinion meshing with the teeth of both racks and arranged to rotate about an axis fixed relative to said transverse plane, each type bead locating and supporting means being connected to a different one of said two racks.

8. A tyre building apparatus as claimed in claim 6, in which the means for expanding and contracting the former comprises a longitudinally disposed shaft within the former which is provided with oppositely-handed screw-threaded portions on each side of said transverse plane, nuts on these screw-threaded portions being arranged to actuate pusher rings.

* * * * *